United States Patent
Lin (10) Patent No.: US 10,595,677 B2
(45) Date of Patent: *Mar. 24, 2020

(54) PORTABLE BIOMASS STOVE

(71) Applicant: Yu-Chia Lin, Miaoli County (TW)

(72) Inventor: Yu-Chia Lin, Miaoli County (TW)

(*) Notice: Subject to any disclaimer, the term of this patent is extended or adjusted under 35 U.S.C. 154(b) by 101 days.

This patent is subject to a terminal disclaimer.

(21) Appl. No.: 15/611,135

(22) Filed: Jun. 1, 2017

(65) Prior Publication Data

US 2017/0347832 A1    Dec. 7, 2017

(30) Foreign Application Priority Data

Jun. 6, 2016 (TW) .............................. 105117805 A (51) Int. Cl.
*A47J 33/00* (2006.01)
*F24B 1/02* (2006.01)
*F24C 1/16* (2006.01)
*F24B 13/00* (2006.01)

(52) U.S. Cl.
CPC .................. *A47J 33/00* (2013.01); *F24B 1/02* (2013.01); *F24B 1/022* (2013.01); *F24B 13/00* (2013.01); *F24C 1/16* (2013.01)

(58) Field of Classification Search
CPC ....................................................... A47J 33/00

USPC ................................................. 126/25 R, 225
See application file for complete search history.

(56) References Cited

U.S. PATENT DOCUMENTS

| 2,414,147 | A | * | 1/1947 | Fleer | F24B 5/026 |
| | | | | | 126/146 |
| 4,471,751 | A | * | 9/1984 | Hottenroth | F24C 1/16 |
| | | | | | 126/15 R |
| 5,797,386 | A | * | 8/1998 | Orr | A47J 37/0704 |
| | | | | | 126/25 A |
| 6,615,821 | B1 | * | 9/2003 | Fisenko | A47J 37/0704 |
| | | | | | 126/15 R |
| 2006/0225724 | A1 | * | 10/2006 | Turner | F24C 1/16 |
| | | | | | 126/9 R |
| 2008/0047541 | A1 | * | 2/2008 | Fou | A47J 37/07 |
| | | | | | 126/25 R |

* cited by examiner

*Primary Examiner* — Avinash A Savani (57) ABSTRACT

A portable biomass stove includes a tubular seat unit and an insulation unit. The tubular seat unit includes an inner tubular seat and an outer tubular seat. The outer tubular seat surrounds the inner tubular seat, cooperates with the inner tubular seat to define an internal space therebetween, and is formed with an air inlet located under the tubular body. A top end portion of the outer tubular seat is connected to a top end portion of the tubular body in a sealing contact manner. The insulation unit is disposed in one of the internal space and an ambient space outside the outer tubular seat so as to prevent dissipation of heat out of the outer tubular seat.

16 Claims, 8 Drawing Sheets

PORTABLE BIOMASS STOVE

CROSS-REFERENCE TO RELATED APPLICATION

This application claims priority of Taiwanese Patent Application No. 105117805, filed on Jun. 6, 2016.

FIELD

The disclosure relates to a biomass stove, and more particularly to a portable biomass stove.

BACKGROUND

A conventional portable biomass stove as disclosed in Chinese Utility Model Patent No. CN203980352U, includes an inner tubular seat and an outer tubular seat. The inner tubular seat has an inner tubular body portion that defines a combustion chamber and that has a plurality of through holes extending radially and communicating fluidly with the combustion chamber. The inner tubular seat further has a seal portion that extends radially outward from a top end of the inner tubular body portion to a top end of the outer tubular seat in a sealing contact manner. The outer tubular seat surrounds the inner tubular body portion, and is formed with a plurality of air inlets that are located under the inner tubular body portion. The inner and outer tubular seats cooperatively define an internal space.

In use, biomass fuel is placed into the combustion chamber for generation of wood gas by pyrolysis. The wood gas flows out of the through holes into the internal space, flows upward together with air coming from the air inlets, and then flows back into the combustion chamber through the through holes which are located proximate to the seal portion for facilitating combustion.

Since the inner and outer tubular seats are typically made of metal, heat dissipation of the inner and outer tubular seats is relatively fast, which may decrease temperature of the wood gas in the internal space below a desirable ignition temperature. As such, the combustion performance is poor and the biomass fuel is not utilized effectively.

The conventional portable biomass stove may be provided with a fan unit so as to facilitate air flow into the internal space. However, without means for properly guiding the direction of the air flow, the air may not be able to mix efficiently with the wood gas for achieving a better combustion process.

SUMMARY

Therefore, an object of the disclosure is to provide a portable biomass stove that can alleviate at least one of the drawbacks of the prior art.

According to the disclosure, the portable biomass stove includes a tubular seat unit and an insulation unit.

The tubular seat unit includes an inner tubular seat and an outer tubular seat. The inner tubular seat has a tubular body defining a combustion chamber which is adapted to receive a biomass fuel therein. The tubular body is formed with a plurality of spaced-apart top and bottom holes that fluidly communicate with the combustion chamber. The outer tubular seat surrounds the inner tubular seat, cooperates with the inner tubular seat to define an internal space therebetween, and is formed with an air inlet located under the tubular body. A top end portion of the outer tubular seat is connected to a top end portion of the tubular body in a sealing contact manner.

The insulation unit is disposed in one of the internal space and an ambient space outside the outer tubular seat so as to prevent dissipation of heat out of the outer tubular seat.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
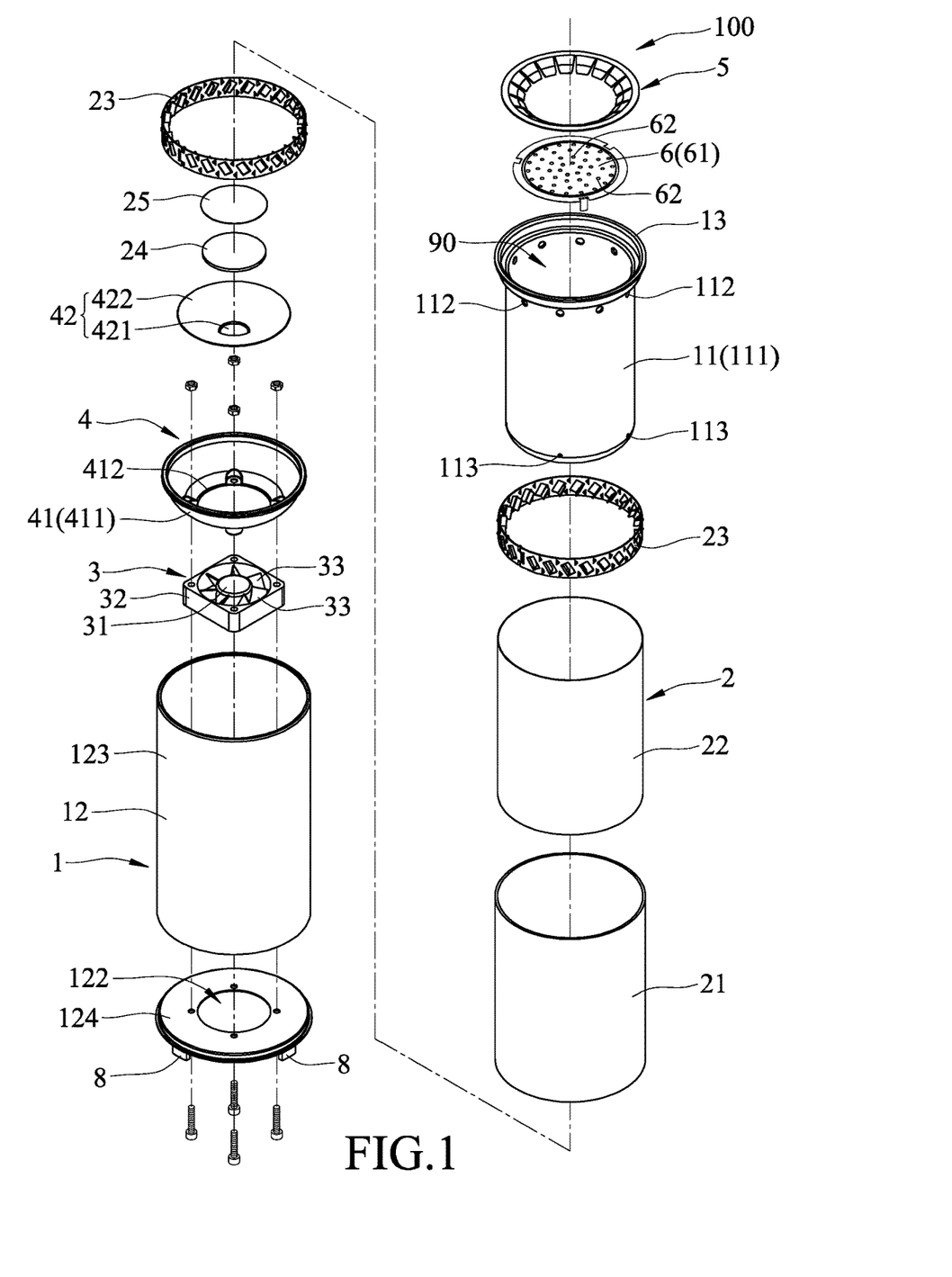
FIG. 1 is an exploded perspective view illustrating a first embodiment of a portable biomass stove according to the disclosure.
Figure 2:
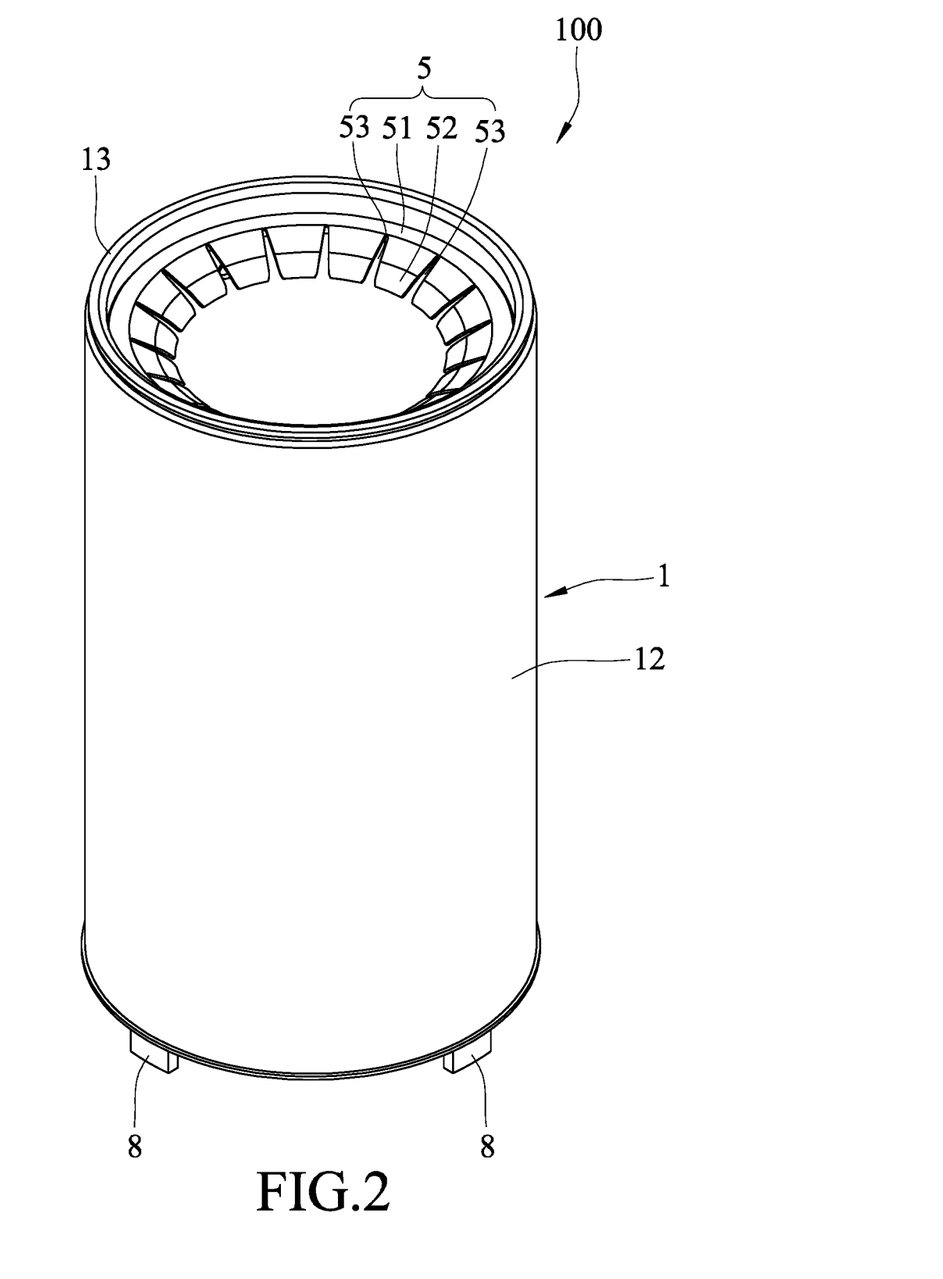
FIG. 2 is an assembled perspective view of the first embodiment.
Figure 3:
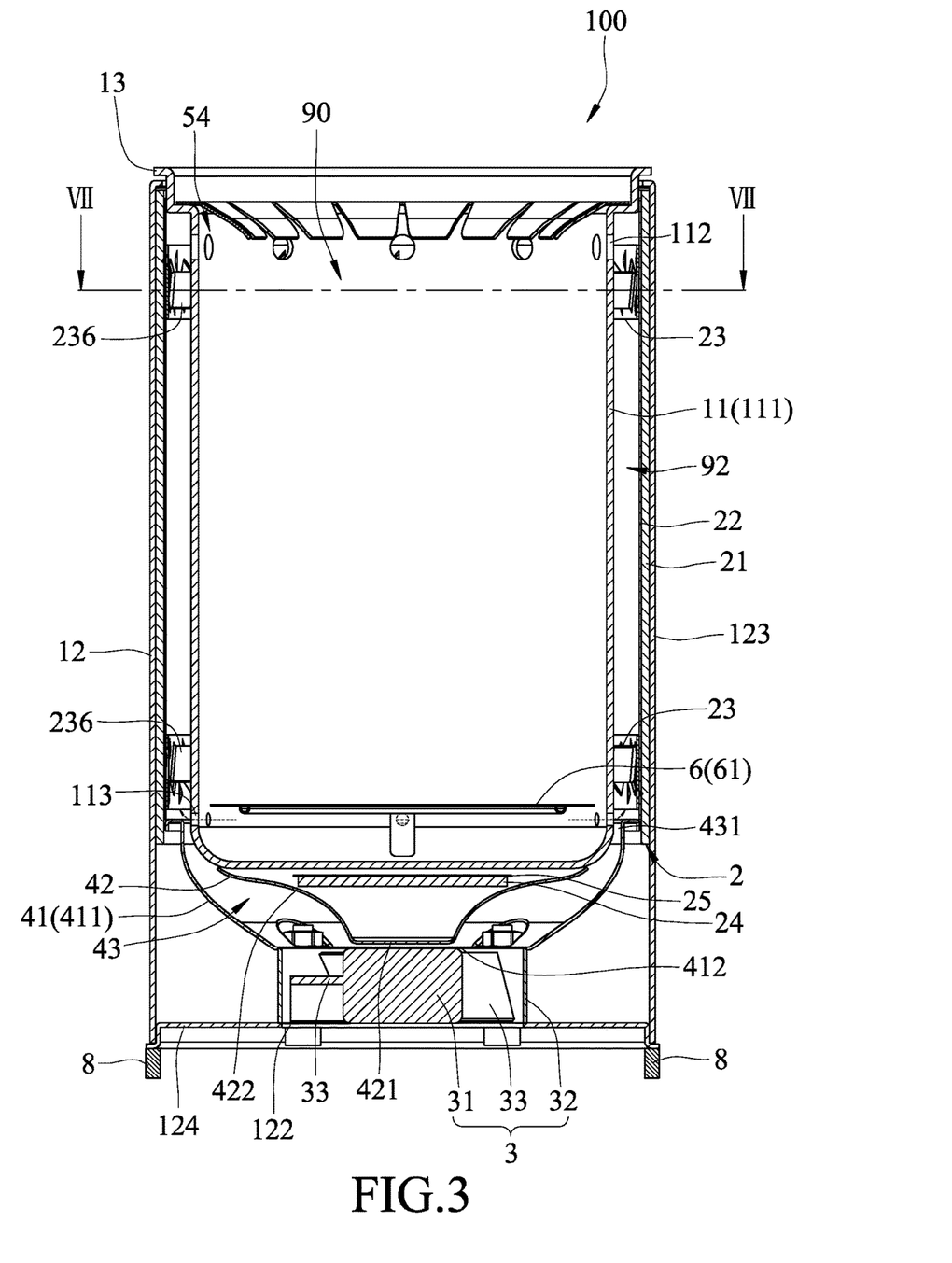
FIG. 3 is a sectional view of the first embodiment.

Referring to FIGS. 1 to 3, a first embodiment of a portable biomass stove 100 includes a tubular seat unit 1, an insulation unit 2, two deflecting seats 23, a fan unit 3, an air-flow guiding unit 4, an annular seat 5, and a perforated plate 6.

The tubular seat unit 1 includes an inner tubular seat 11 and an outer tubular seat 12. The inner tubular seat 11 has a tubular body 111 defining a combustion chamber 90 which is adapted to receive a biomass fuel (not shown) therein. The tubular body 111 is formed with a plurality of spaced-apart top and bottom holes 112, 113 that fluidly communicate with the combustion chamber 90. The outer tubular seat 12 surrounds the inner tubular seat 11, cooperates with the inner tubular seat 11 to define an internal space 92 therebetween, and is formed with an air inlet 122 which is located under the tubular body 111 and through which air enters into the internal space 92. In this embodiment, the outer tubular seat 12 has a substantially flat base 124 that is formed with the air inlet 122, and a main body 123 that is in the form of a hollow cylinder and that is coupled to the base 124.

It should be noted that the portable biomass stove 100 may be provided with a plurality of support members 8 disposed under the base 124 of the outer tubular seat 12 for ensuring sufficient air to flow into the air inlet 122. In a variation of this embodiment, the outer tubular seat 12 may have a plurality of the air inlets 122 for entrance of air into the internal space 92.

As illustrated in FIG. 3, a top end portion of the outer tubular seat 12 is connected to a top end portion of the tubular body 111 in a sealing contact manner. In this embodiment, the tubular body 111 has a seal portion 13 that is at the top end portion thereof, and that extends radially outward from the top end portion of the tubular body 111 to the top end portion of the outer tubular seat 12. The seal portion 13 is connected to the top end portion of the outer tubular seat 12 in an interference fit manner so as to prevent heat dissipation and leaking of air streams from the internal space 92.

In this embodiment, the insulation unit 2 is disposed in the internal space 92 so as to prevent dissipation of heat out of the outer tubular seat 12. The insulation unit 2 includes a main insulation member 21 and a main reflective member 22.

The main insulation member 21 is disposed in the internal space 92, surrounds the tubular body 111 of the inner tubular seat 11, and contacts an inner surrounding surface of the outer tubular seat 12. The main reflective member 22 surrounds the tubular body 111 of the inner tubular seat 11, is disposed between the main insulation member 21 and the tubular body 111, and is adapted to reflect heat in the internal space 92 so as to facilitate the prevention of dissipation of heat out of the outer tubular seat 12.

In this embodiment, the main insulation member 21 is fibrous. The main reflective member 22 is made of a material having a melting point greater than 1000 degrees Celsius. The main reflective member 22 is, for example, a copper foil which has a smooth surface that reduces the resistance encountered by the air streams flowing in the internal space 92. In addition, since heat is transferred by conduction, convection, or radiation, the configurations of the main insulation member 21 and the main reflective member 22 effectively reduce heat transferred from the inner tubular seat 11 to the outer tubular seat 12, and effectively prevent the heat from radiating out of the outer tubular seat 12.

Figure 4:
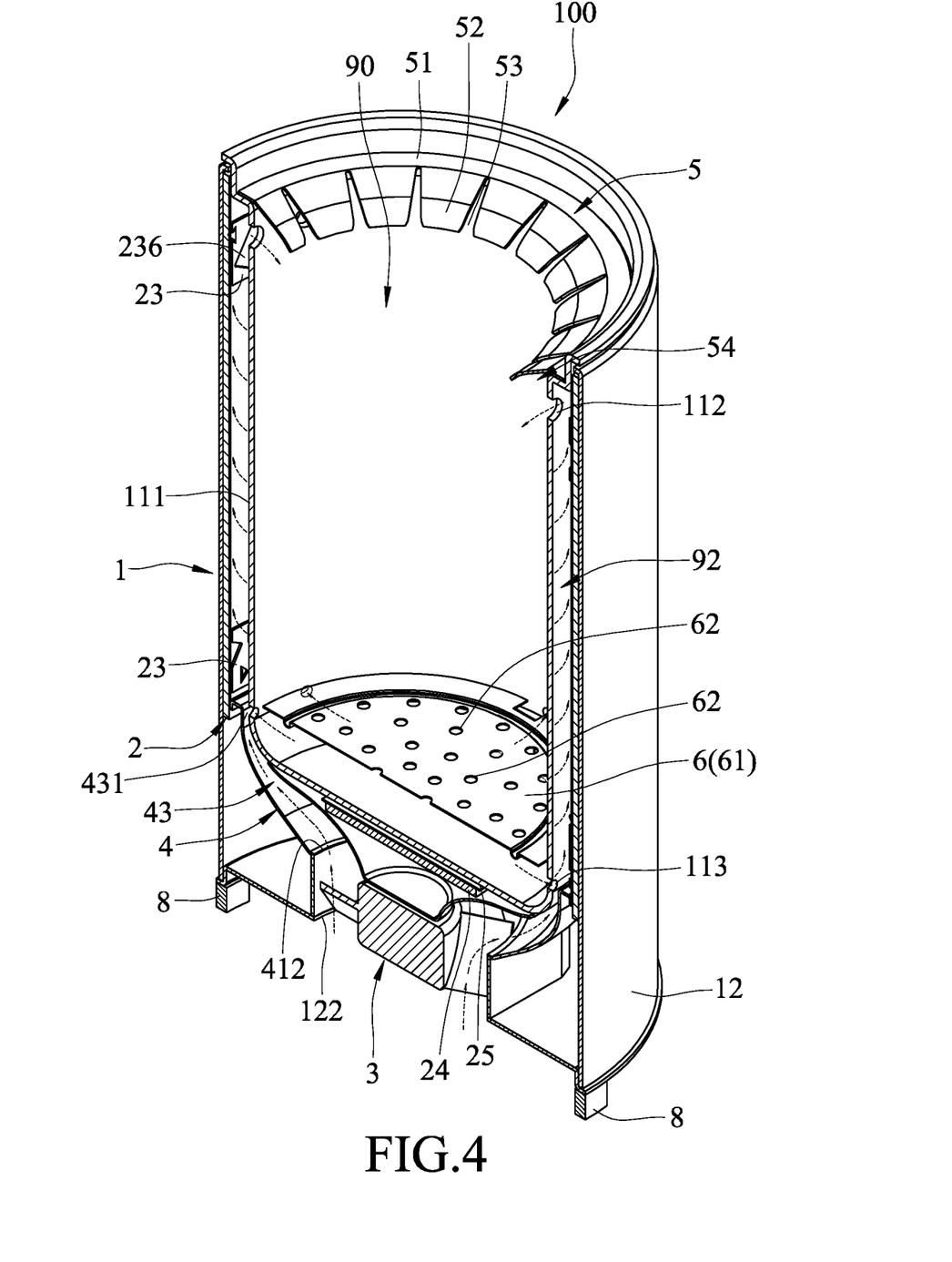
FIG. 4 is a fragmentary sectional perspective view of the first embodiment, illustrating the flow of air streams.
Figure 5:
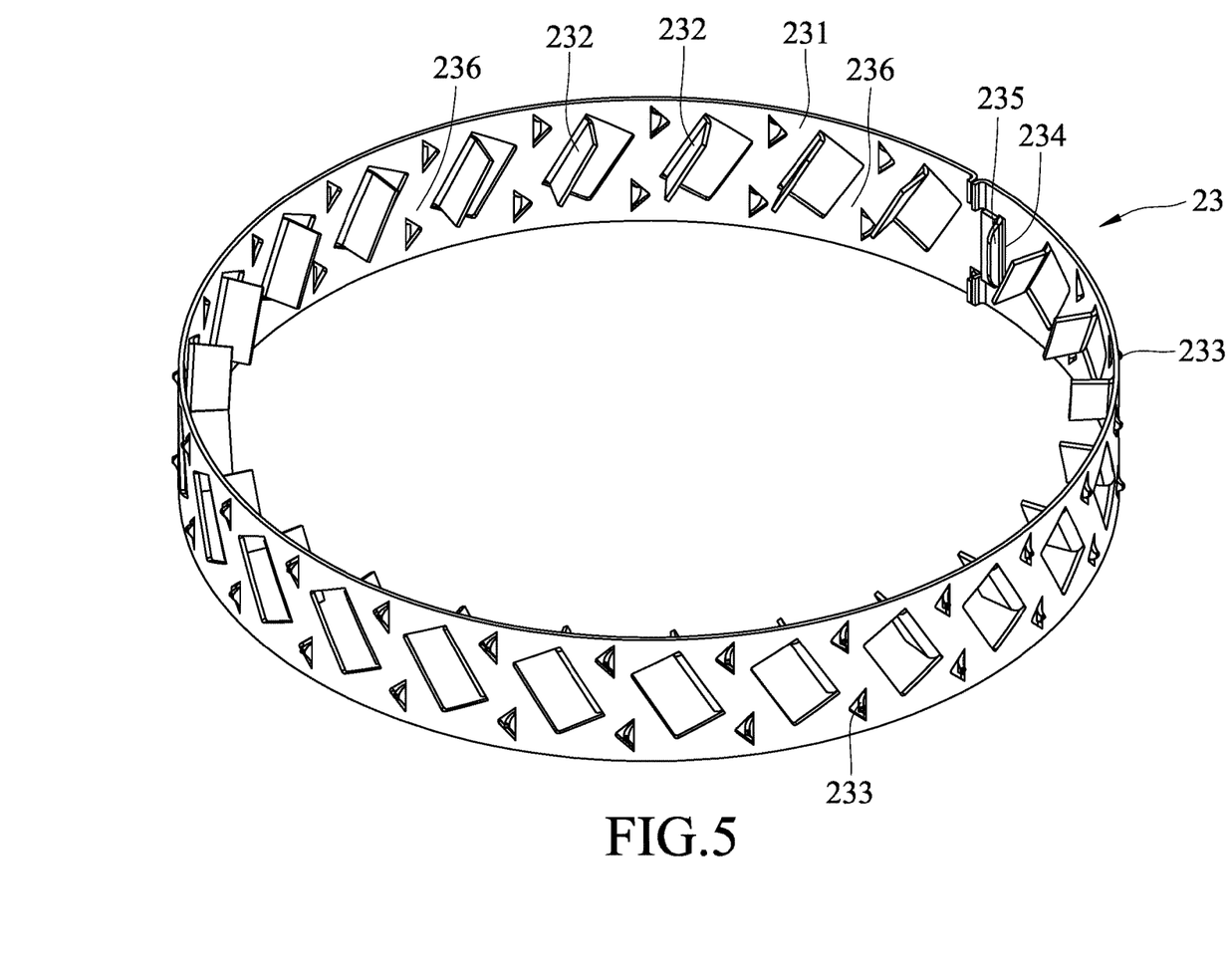
FIG. 5 is a perspective view of a flow-directing seat of the first embodiment.
Figure 6:
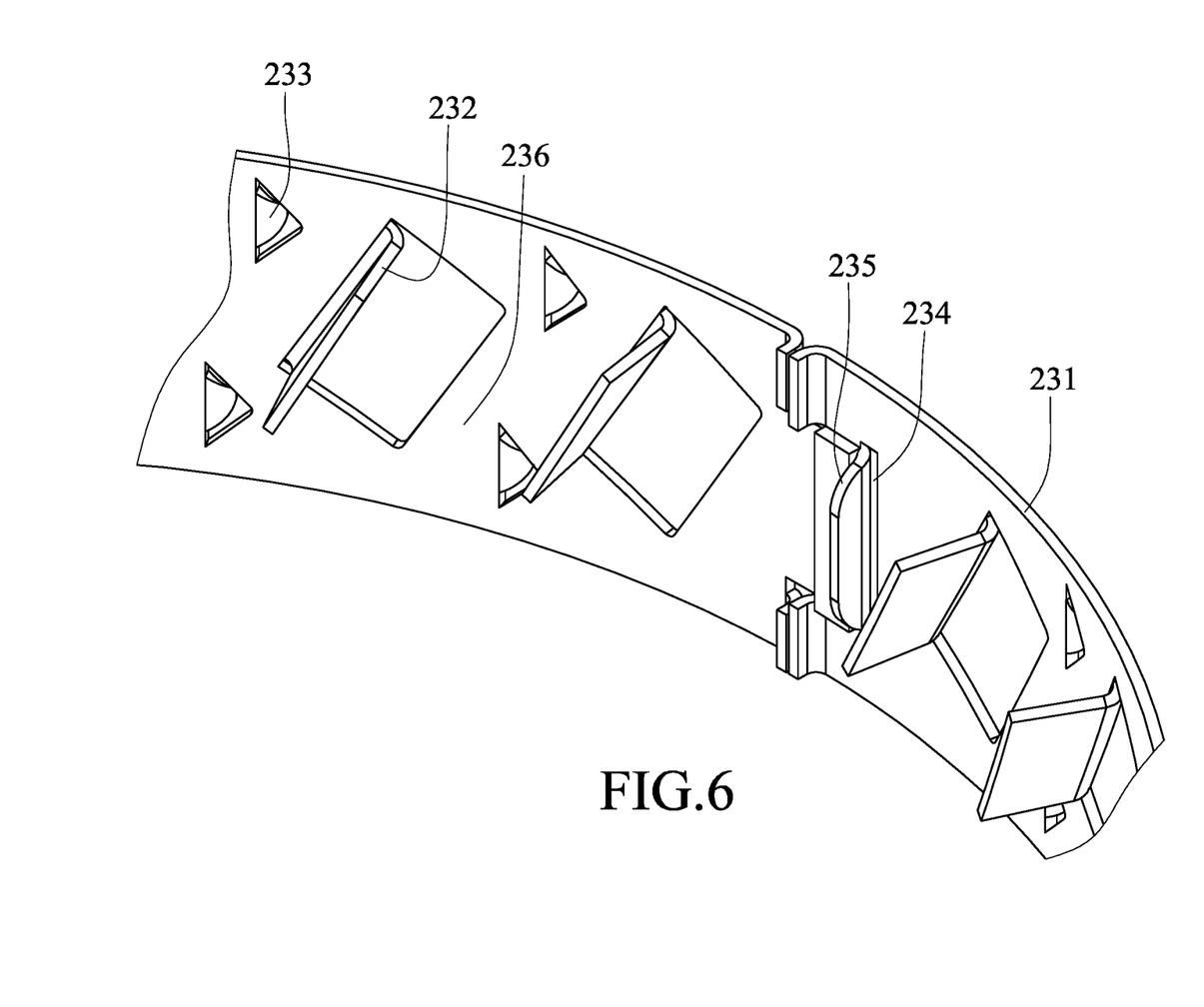
FIG. 6 is a fragmentary enlarged perspective view of the flow-directing seat.

Referring to FIGS. 4 to 6, the deflecting seats 23 surround the tubular body 111, are disposed between the main reflective member 22 and the tubular body 111, are located below the top holes 112 and above the bottom holes 113, and are spaced apart from each other.

Figure 7:
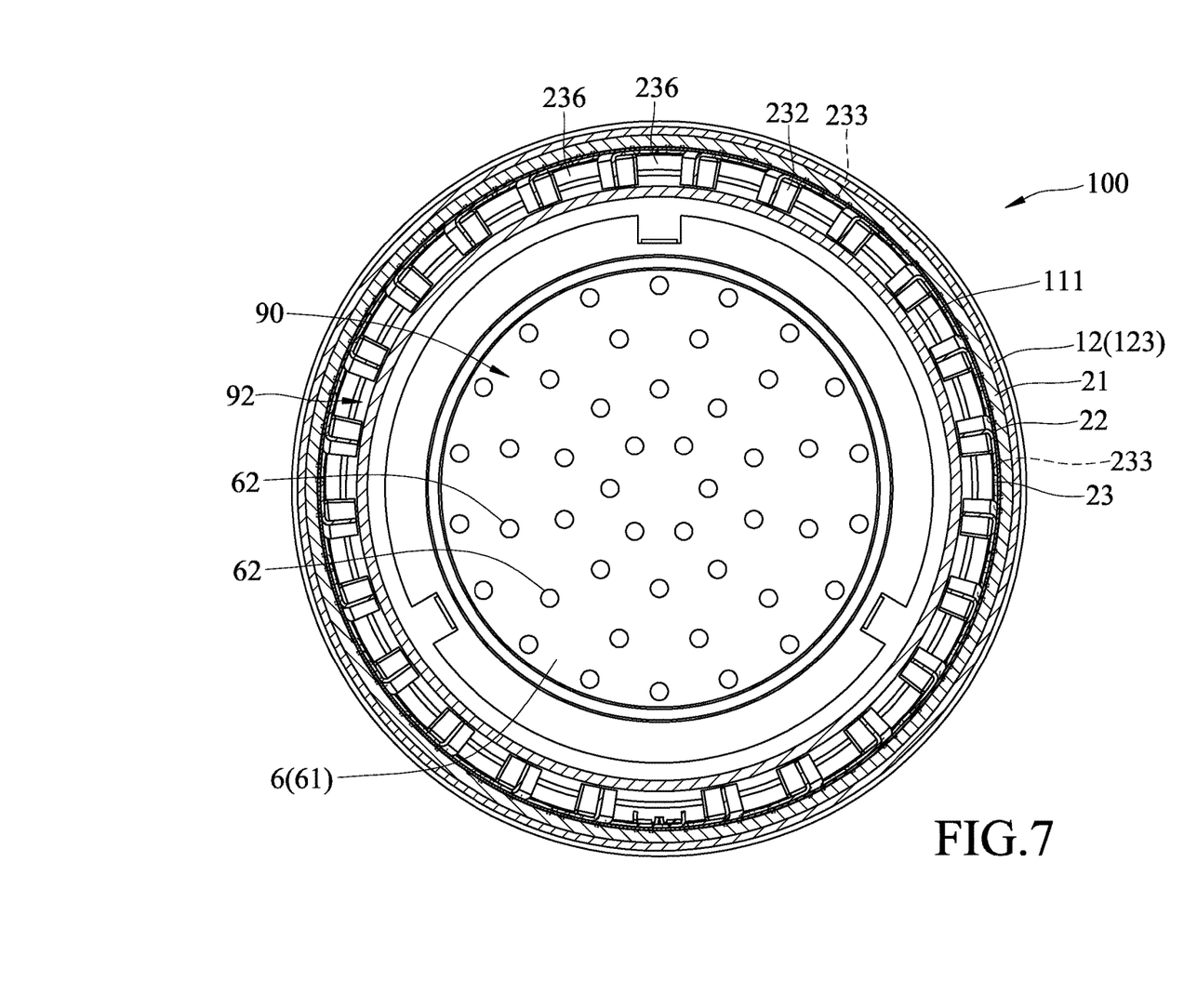
FIG. 7 is a sectional view of the first embodiment taken along line VII-VII in FIG. 3.

Each of the deflecting seats 23 has a ring-shaped body 231, a plurality of oblique deflecting fins 232, and a plurality of positioning members 233. The deflecting fins 232 are connected to the ring-shaped body 231. Specifically, the deflecting fins 232 extend inwardly from the ring-shaped body 231. Each adjacent pair of the deflecting fins 232 defines a channel 236 that is adapted for directing flow of air streams in the internal space 92. The positioning members 233 project outwardly from the ring-shaped body 231, and penetrate through the main reflective member 22 and into the main insulation member 21, as shown in FIG. 7.

In greater detail, the ring-shaped body 231 of each of the deflecting seats 23 is bent from a long strip with opposite end portions thereof coupled to each other. One of the end portions of the long strip is formed with an engaging groove 234 (see FIGS. 5 and 6), and the other one of the opposite end portions of the long strip has an engaging block 235 that engages the engaging groove 234. In this embodiment, the ring-shaped body 231 is made of metal, the deflecting fins 232 are formed by cutting the ring-shaped body 231 and flipping the cut portions inwardly, and the positioning members 233 are formed by cutting the ring-shaped body 231 and flipping the cut portions outwardly.

Since the deflecting seats 23 are made of metal, the deflecting seats 23 are heated during a combustion process and may serve to pre-heat the air streams passing therethrough. It should be noted that the number of the deflecting seat 23 may be one in other variation of this embodiment.

Referring back to FIGS. 1, 3, and 4, the fan unit 3 is disposed in the outer tubular seat 12 at a bottom side of the inner tubular seat 11, and is adapted for drawing air into the internal space 92 through the air inlet 122. In this embodiment, the fan unit 3 is disposed on the base 124 of the outer tubular seat 12.

The air-flow guiding unit 4 is disposed at a top side of the fan unit 3, is connected to a bottom end portion of the insulation unit 2, and includes an outer seat 41, an inner seat 42. The outer seat 41 has a bowl-shaped seat body 411 having an opening 412. The opening 412 is formed in a bottom of the seat body 411 and fluidly communicates with the air inlet 122 of the outer tubular seat 12. The inner seat 42 is surrounded by the outer seat 41, has a bottom wall 421 and a surrounding wall 422 that extends upwardly and outwardly from the bottom wall 421.

As shown in FIG. 3, the fan unit 3 includes a drive axle 31 that is registered with the bottom wall 421 of the inner seat 42, a peripheral wall 32 that surrounds the drive axle 31, and a plurality of blades 33 that are co-rotatably connected to the drive axle 31. In this embodiment, the drive axle 31 has a diameter substantially equal to that of the bottom wall 421, and a top end of the peripheral wall 32 is connected to a bottom end of the outer seat 41. It should be noted that as long as the fan unit 3 is capable of drawing air into the internal space 92, the fan unit 3 may be configured to be bladeless.

In this embodiment, the inner seat 42 cooperates with the outer seat 41 to define an air-flow guiding space 43 narrowing upwardly toward the insulation unit 2. The air-flow guiding space 43 has a narrow portion 431 that is adjacent to the bottom holes 113 and that fluidly communicates with the internal space 92. The cross section of the narrow portion 431 of the air-flow guiding space 43 is smaller than that of the internal space 92. As such, according to Bernoulli's Theorem, when air flows into the internal space 92 through the narrow portion 431 of the air-flow guiding space 43, a pressure difference is generated which facilitates flowing of a wood gas generated in the combustion chamber 90 to enter into the internal space 92 through the bottom holes 113, as indicated by the dotted arrows in FIG. 3.

The insulation unit 2 further includes an auxiliary insulation member 24 that is disposed in the inner seat 42 of the air-flow guiding unit 4, and an auxiliary reflective member 25 that is disposed between the auxiliary insulation member 24 and the tubular body 111 and that is for reflecting heat. The auxiliary reflective member 25 is, for example, copper foil or aluminum foil. The auxiliary insulation member 24 and the auxiliary reflective member 25 prevent damage of the fan unit 3 from the heat dissipated from the combustion chamber 90, so as to improve the service life of the fan unit 3.

The annular seat 5 has an outer annular portion 51 that is connected to the tubular body 111 of the inner tubular seat 11, and an inner annular portion 52 that extends inwardly from the outer annular portion 51 into the combustion chamber 90, and that is formed with a plurality of angularly spaced-apart notches 53. The notches 53 extend from an inner edge of the inner annular portion 52 toward the outer annular portion 51 of the annular seat 5. The annular seat 5 and the tubular body 111 of the inner tubular seat 11 cooperatively form a wood gas retaining zone 54 which is located proximate to the top holes 112 and which prevents the mixture of the wood gas and the air streams from directly flowing out of the tubular seat unit 1. In this way, the mixture of the wood gas and the air streams is retained in a top portion of the combustion chamber 90 for a longer period of time, which facilitates the combustion process.

As illustrated in FIG. 3, the inner annular portion 52 of the annular seat 5 forms an acute angle with the tubular body 111 of the inner tubular seat 11. The inner annular portion 52 of the annular seat 5 may form an obtuse angle with the tubular body 111 in other variation of this embodiment.

The perforated plate 6 is removably disposed in the combustion chamber 90, is adapted for placing of the biomass fuel thereon, and is located between the top and bottom holes 112, 113 so as to prevent the biomass fuel and the ashes generated by combustion of the biomass fuel from obstructing the flow of the wood gas. The perforated plate 6 has a plate body 61 and a plurality of perforations 62 that extend through the plate body 61 and that fluidly communicate with the combustion chamber 90 and the bottom holes 113. The perforated plate 6 can be easily removed from the combustion chamber 90 for cleaning purpose.

When in use, the fan unit 3 may be operated for drawing more air into the internal space 92 through the air inlet 122. The air drawn by the fan unit 3 flows through the air-flow guiding unit 4 via the opening 412 into the internal space 92. The wood gas generated from pyrolysis of the biomass fuel flows from combustion chamber 90 into the internal space 92 through the bottom holes 113, and mixes with the air streams which enter the internal space 92 from the air-flow guiding space 43. By virtue of the configuration of the oblique channels 236, the mixture of the wood gas and the air streams move upwardly and form a helical route (as indicated by the dotted arrows in the internal space 92 of FIG. 4) after passing through the channels 236, and then flows back into the combustion chamber 90 through the top holes 112 for assisting with the combustion process. Comparing to traveling directly upward, the mixture of the wood gas and the air streams stays in the internal space 92 for a longer period of time, and a better mixing of the wood gas and the air streams is achieved, which contributes to a better combustion process. In addition, flows of the wood gas and the air streams may undergo irregular fluctuations upon encountering the deflecting fins 232, which facilitates mixing of the wood gas and the air streams.

Figure 8:
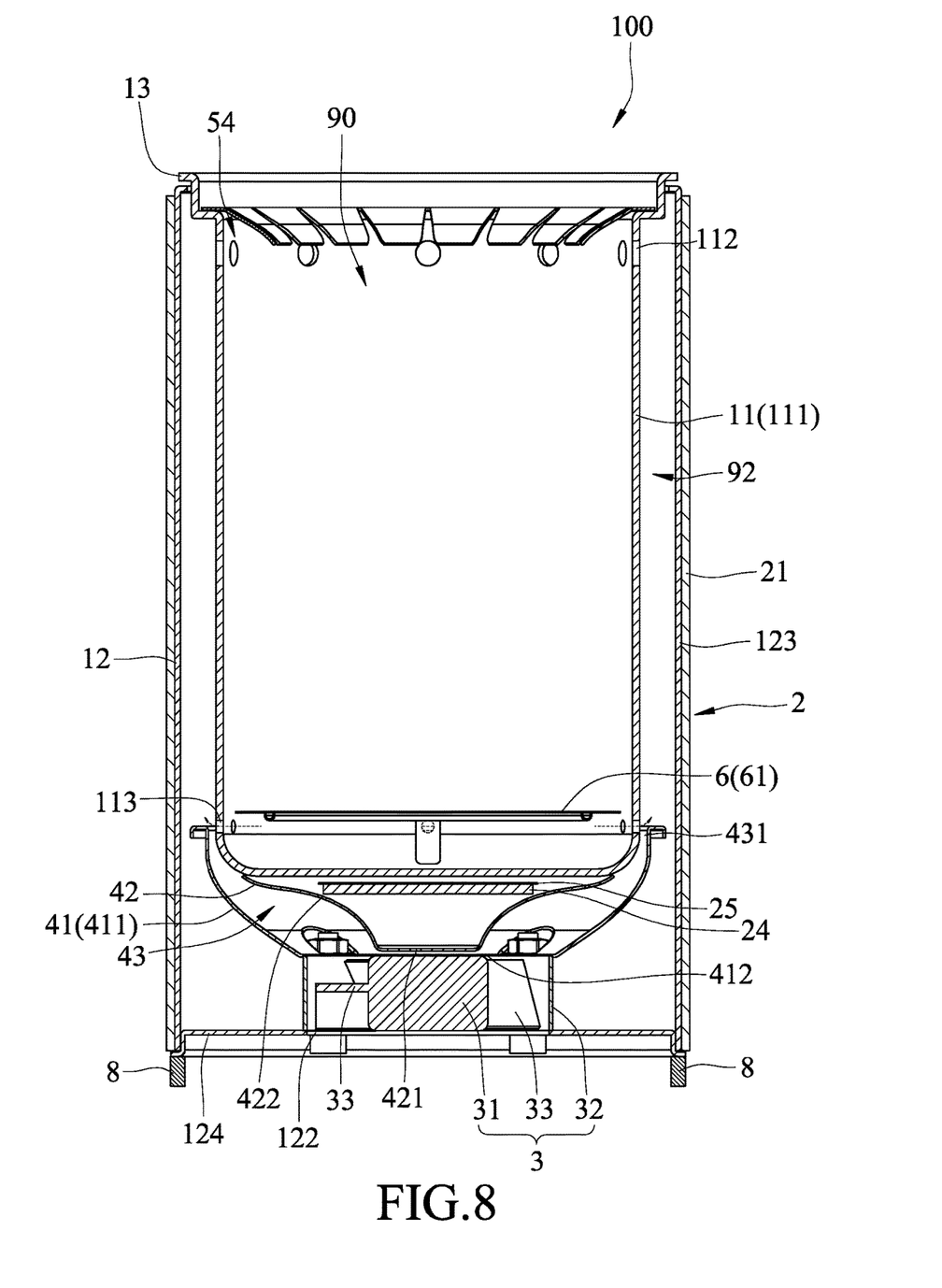
FIG. 8 is a sectional view illustrating a second embodiment of the portable biomass stove according to the disclosure.

Referring to FIG. 8, a second embodiment of a portable biomass stove 100 according to the disclosure is similar to the first embodiment, the differences between the first and second embodiments are described as follows. The deflecting seats 23 (see FIG. 1) are omitted in the second embodiment. The insulation unit 2 of the second embodiment is disposed in an ambient space outside the outer tubular seat 12, and includes a main insulation member 21 that surrounds the outer tubular seat 12. In this embodiment, the main insulation member 21 is fibrous.

It is worth mentioning that in other modification of the portable biomass stove 100 of the disclosure, the main insulation member 21 may be configured to have two insulation layers spaced apart from each other with an air space formed therebetween.

In summary, the insulation unit 2 effectively prevents dissipation of heat out of the outer tubular seat 12, thereby preserving thermal energy. In this way, a desired ignition temperature can be reached more easily for a better combustion process. By virtue of the air-flow guiding unit 4, the air streams are properly guided to the internal space 92, which contributes to a better combustion process. By the design of the narrow portion 431 of the air-flow guiding space 43, flow of the wood gas into the internal space 92 is facilitated. In addition, the perforated plate 6 prevents the biomass fuel from blocking the bottom holes 113, thereby ensuring a smooth flow of the wood gas into the internal space 92.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A portable biomass stove comprising:
    a tubular seat unit including
        an inner tubular seat that has a tubular body defining a combustion chamber which is adapted to receive a biomass fuel therein, said tubular body being formed with a plurality of spaced-apart top and bottom holes that fluidly communicate with said combustion chamber, and
        an outer tubular seat that surrounds said inner tubular seat, that cooperates with said inner tubular seat to define an internal space therebetween, and that is formed with an air inlet located under said tubular body, a top end portion of said outer tubular seat being connected to a top end portion of said tubular body in a sealing contact manner; and
    an insulation unit disposed in one of said internal space and an ambient space outside said outer tubular seat so as to prevent dissipation of heat out of said outer tubular seat,
        wherein said insulation unit includes a main insulation member that is disposed in said internal space, and that surrounds said tubular body of said inner tubular seat.

2. The portable biomass stove as claimed in claim 1, wherein said insulation unit further includes a main reflective member that surrounds said tubular body of said inner tubular seat, that is disposed between said main insulation member and said tubular body, and that is adapted to reflect heat in said internal space so as to facilitate the prevention of dissipation of heat out of said outer tubular seat.

3. The portable biomass stove as claimed in claim 2, further comprising at least one flow-directing seat that surrounds said tubular body, that is disposed between said main reflective member and said tubular body, and that has a ring-shaped body and a plurality of oblique deflecting fins connected to said ring-shaped body, each adjacent pair of said deflecting fins defining a channel that is adapted for directing flow of air streams in said internal space.

4. The portable biomass stove as claimed in claim 3, wherein:
    said main insulation member is fibrous;

said deflecting fins extending inwardly from said ring-shaped body; and said at least one flow-directing seat further has a plurality of positioning members projecting outwardly from said ring-shaped body, and penetrating through said main reflective member and into said main insulation member.

5. The portable biomass stove as claimed in claim 1, further comprising an annular seat having an outer annular portion that is connected to said tubular body of said inner tubular seat, and an inner annular portion that extends inwardly from said outer annular portion into said combustion chamber, and that is formed with a plurality of angularly spaced-apart notches.

6. A portable biomass stove comprising:

a tubular seat unit including an inner tubular seat that has a tubular body defining a combustion chamber which is adapted to receive a biomass fuel therein, said tubular body being formed with a plurality of spaced-apart top and bottom holes that fluidly communicate with said combustion chamber, and an outer tubular seat that surrounds said inner tubular seat, that cooperates with said inner tubular seat to define an internal space therebetween, and that is formed with an air inlet located under said tubular body, a top end portion of said outer tubular seat being connected to a top end portion of said tubular body in a sealing contact manner;

an insulation unit disposed in one of said internal space and an ambient space outside said outer tubular seat so as to prevent dissipation of heat out of said outer tubular seat; and a perforated plate removably disposed in said combustion chamber, adapted for placing of the biomass fuel thereon, and located between said top and bottom holes so as to prevent the biomass fuel from blocking said bottom holes, said perforated plate having a plate body and a plurality of perforations that extend through said plate body and that fluidly communicate with said combustion chamber and said bottom holes.

7. A portable biomass stove comprising:

a tubular seat unit including an inner tubular seat that has a tubular body defining a combustion chamber which is adapted to receive a biomass fuel therein, said tubular body being formed with a plurality of spaced-apart top and bottom holes that fluidly communicate with said combustion chamber, and an outer tubular seat that surrounds said inner tubular seat, that cooperates with said inner tubular seat to define an internal space therebetween, and that is formed with an air inlet located under said tubular body, a top end portion of said outer tubular seat being connected to a top end portion of said tubular body in a sealing contact manner;

an insulation unit disposed in one of said internal space and an ambient space outside said outer tubular seat so as to prevent dissipation of heat out of said outer tubular seat;

a fan unit disposed in said outer tubular seat at a bottom side of said inner tubular seat, and adapted for drawing air into said internal space through said air inlet; and an air-flow guiding unit disposed at a top side of said fan unit, connected to a bottom end portion of said insulation unit, and including an outer seat that has a bowl-shaped seat body having an opening that is formed in a bottom of said seat body and that fluidly communicates with said air inlet of said outer tubular seat, such that the air drawn by said fan unit flows through said air-flow guiding unit via said opening into said internal space.

8. The portable biomass stove as claimed in claim 7, wherein:

said air-flow guiding unit further includes an inner seat that is surrounded by said outer seat, that has a bottom wall and a surrounding wall that extends upwardly and outwardly from said bottom wall, and that cooperates with said outer seat to define an air-flow guiding space narrowing upwardly toward said insulation unit.

9. The portable biomass stove as claimed in claim 8, said fan unit includes a drive axle that is registered with said bottom wall of said inner seat and that has a diameter substantially equal to that of said bottom wall, a peripheral wall that is connected to a bottom end of said outer seat and that surrounds said drive axle, and a plurality of blades that are co-rotatably connected to said drive axle.

10. The portable biomass stove as claimed in claim 9, wherein said insulation unit further includes an auxiliary insulation member that is disposed in said inner seat of said air-flow guiding unit, and an auxiliary reflective member that is disposed between said auxiliary insulation member and said tubular body, said auxiliary insulation member and said auxiliary reflective member preventing damage of said fan unit from the heat dissipated from said combustion chamber.

11. The portable biomass stove as claimed in claim 6, wherein said insulation unit is disposed in the ambient space outside said outer tubular seat, and includes a main insulation member that surrounds said outer tubular seat.

12. The portable biomass stove as claimed in claim 11, wherein said main insulation member is fibrous.

13. The portable biomass stove as claimed in claim 6, further comprising an annular seat having an outer annular portion that is connected to said tubular body of said inner tubular seat, and an inner annular portion that extends inwardly from said outer annular portion into said combustion chamber, and that is formed with a plurality of angularly spaced-apart notches.

14. The portable biomass stove as claimed in claim 7, further comprising an annular seat having an outer annular portion that is connected to said tubular body of said inner tubular seat, and an inner annular portion that extends inwardly from said outer annular portion into said combustion chamber, and that is formed with a plurality of angularly spaced-apart notches.

15. The portable biomass stove as claimed in claim 7, wherein said insulation unit is disposed in the ambient space outside said outer tubular seat and includes a main insulation member that surrounds said outer tubular seat.

16. The portable biomass stove as claimed in claim 15, wherein said main insulation member is fibrous.

* * * * *